April 22, 1958     J. R. ALMOND     2,831,733
AUTOMATIC SHUT-OFF VALVE ASSEMBLY
Filed March 22, 1952     2 Sheets-Sheet 1
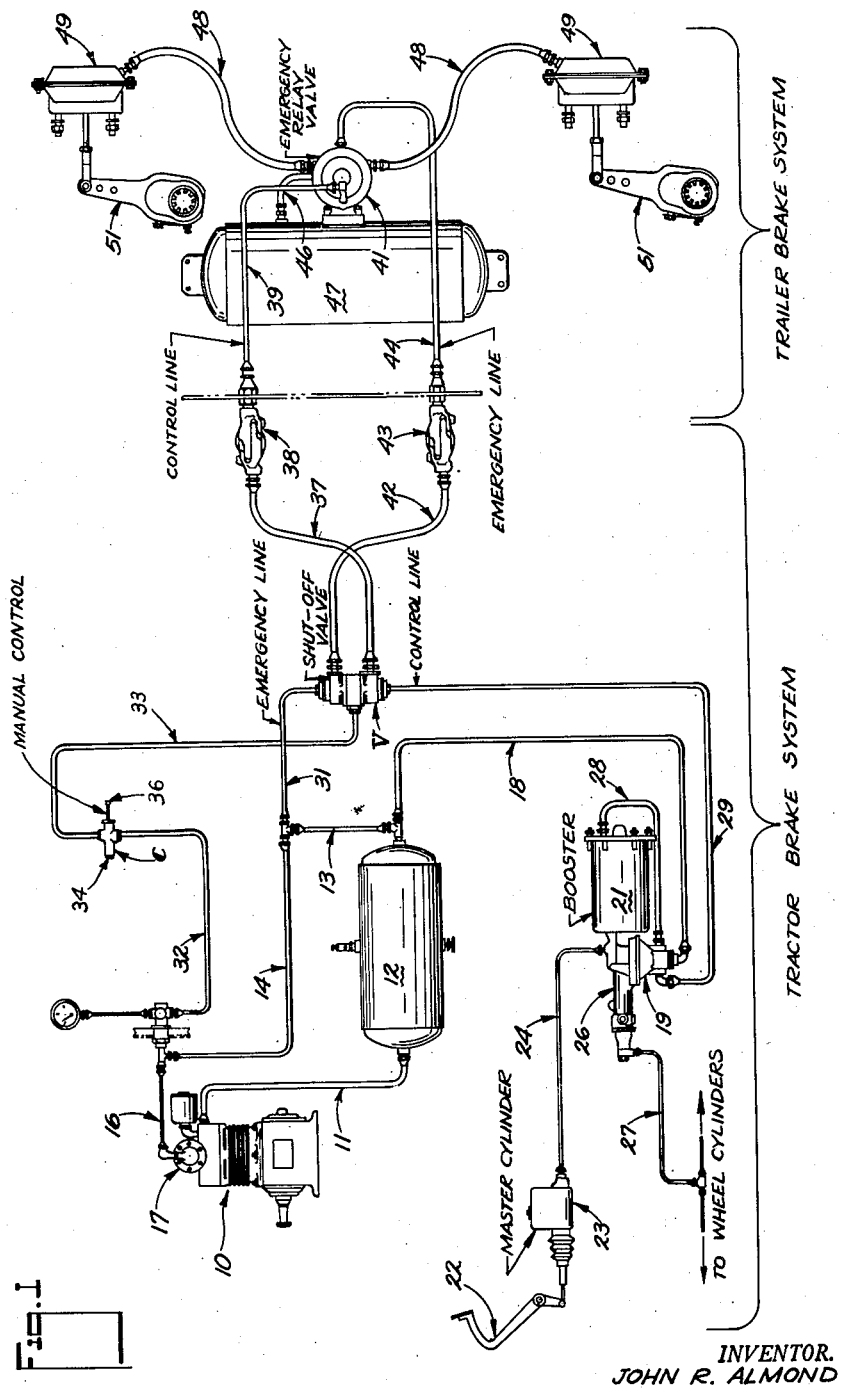
INVENTOR.
JOHN R. ALMOND
BY
RICHEY, WATTS, EDGERTON & McNENNY
ATTORNEYS April 22, 1958   J. R. ALMOND   2,831,733
AUTOMATIC SHUT-OFF VALVE ASSEMBLY
Filed March 22, 1952   2 Sheets-Sheet 2
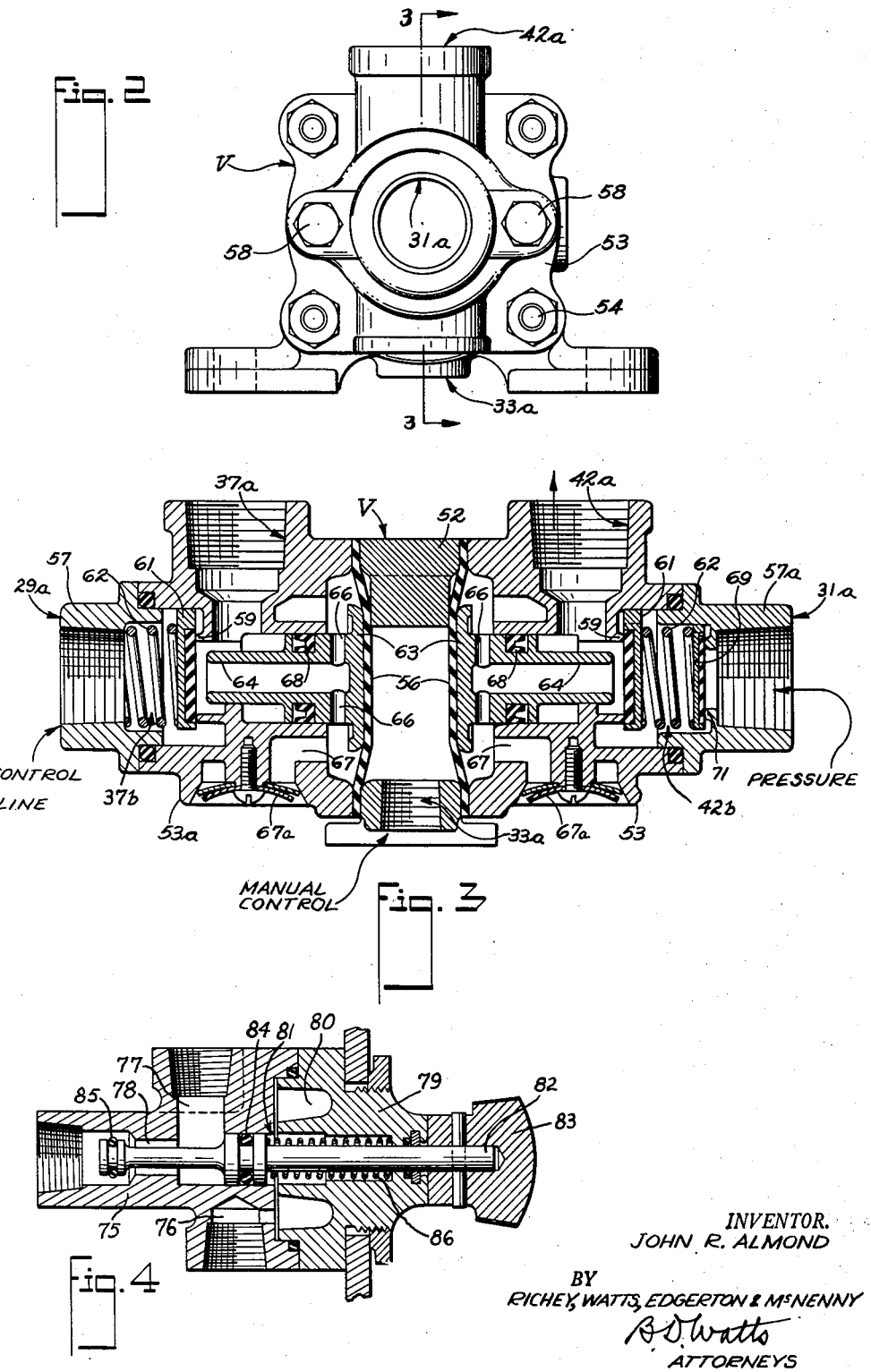

United States Patent Office 2,831,733
Patented Apr. 22, 1958

2,831,733

AUTOMATIC SHUT-OFF VALVE ASSEMBLY

John R. Almond, Detroit, Mich., assignor to Midland-Ross Corporation, Cleveland, Ohio, a corporation of Ohio Application March 22, 1952, Serial No. 278,061

6 Claims. (Cl. 303—26)

This invention relates to vehicle brake systems and more particularly to fluid pressure systems for tractor and trailer combinations.

The principal object of the invention resides in improving the safety characteristics of the system of the type referred to which is accomplished by rendering it possible at all times for the driver to exercise complete control over the actuation of the tractor brakes, as well as insuring that in case of damage to the connecting line, the trailer brakes will be set automatically.

It is customary in a common type of installation to provide an air reservoir for the trailer which is connected to a relay valve that controls application of the air brakes of the trailer. Two lines lead from the tractor system to the trailer system, one of these being the control line for giving selective application for the trailer brakes and the other being an emergency line that is normally in communication with the pressure source of the tractor and operates in conjunction with the trailer relay valve to automatically set the trailer brakes in case the trailer becomes separated from the tractor with the resultant breakage of the connecting lines. However, it has been found that if the control line breaks or separates, springs a leak, or is not properly coupled while the emergency line remains intact, the operator, who is unaware of this condition, will find that when he attempts to apply the brakes at the tractor pedal he has no control over either the tractor brakes or the trailer brakes because upon depressing the brake pedal, the tractor pressure source merely bleeds through the fracture rather than being confined to the tractor booster cylinder and the trailer relay valve.

The principal feature of the invention is that a manually-controlled valve system controllable from the driving station enables the driver, under the aforesaid circumstances, to isolate the tractor brakes system from the leak to thereby provide control over the tractor brakes. This system also provides for retaining control of the tractor brakes in case of fracture of the emergency line leading from the tractor to the trailer. These objects and advantages are, in the preferred embodiment of the invention attained by connecting a shut-off valve into the control and emergency lines which has pressure responsive means therein arranged to open check valves in each line for normal operation but which, under control of a manually-operable valve convenient to the driver, can be set to permit the check valves to close and prevent escape of pressure fluid from the tractor system which might otherwise occur due to a defect in the trailer systems or in the connections between the tractor and trailer.

The manner in which these objects and advantages are attained will be apparent in the following detailed description of the preferred embodiment of the invention.

In the drawings:

Fig. 1 is a diagram of a typical installation embodying the invention;

Fig. 2 is an end view of the manually-controlled shut-off valve;

Fig. 3 is a section through the valve taken on 3—3 of Fig. 2; and

Fig. 4 is a longitudinal sectional view of the two-way control valve of Fig. 1.

Referring to Fig. 1, the engine-driven compressor 10 has an output line 11 connected to a tractor air reservoir 12 in order to govern the action of the regulator lines 13 and 14 and 16 leading from the reservoir to a compressor governor control unit 17, the details of which form no part of the invention. Another line 18 from the reservoir 12 connects to a tractor relay control valve 19 mounted on a hydraulically-controlled air booster unit 21. Unit 21 is of the type which is responsive to pressure in the pedal-controlled hydraulic master cylinder and may be of the type disclosed in the co-pending application of John R. Almond and George Kricker, Serial No. 686,810, filed July 29, 1946, now abandoned, which is a continuation of abandoned case Serial No. 448,602, filed June 26, 1942. The booster unit is controlled by the pedal 22 connected to the master cylinder 23 which in turn, by means of line 24, connects to the relay valve 19 by way of the booster cylinder 26. Pressure fluid from the latter cylinder is conducted by lines 27 to the hydraulic wheel cylinders on the tractor. The relay valve has a controlled line 28 for supplying air pressure to the booster air cylinder and leading from the valve is a control line 29 for selectively supplying controlled air pressure to the shut-off valve V. The pressure in control line 29 is a function of pedal pressure, in accordance with current brake practice as exemplified in the aforesaid application.

The construction of the shut-off valve V, which forms part of this invention, will be explained in detail after a brief description of the entire system is completed.

Pressure line 31 leading from reservoir line 13 serves as an emergency line and is connected to the shut-off valve V. In order to provide pressure for manual control of the shut-off valve V, a pressure line 32, connected by means of line 14 to the tractor reservoir 12, leads to the inlet of a manual control valve C located at the driving station. Outlet line 33 leads from manual valve C to the control chamber of shut-off valve V. There is also an atmosphere exhaust port 34 in the manual control valve C. Valve handle 36 permits adjusting the manual control valve C to either of two settings. In the normal setting, the atmosphere port 34 is closed and pressure inlet line 32 is connected to line 33 thereby applying pressure to the control chamber 56a of the shut-off valve V. In the other position, the inlet line 32 is isolated and the shut-off valve control line 33 is exhausted to atmosphere by way of port 34 in the manual valve. Two-way valves of this type are generally known in the valve art and the design details and internal arrangements thereof are not critical to the invention. In Fig. 4 is shown one form of two-way manual control valve which may be used in the system of Fig. 1. This valve comprises a body 75 having a pressure inlet port 76, an outlet port 77 and an atmosphere port 78. A cap 79 is connected to one end of body 75 and includes a recess 80 which communicates with inlet port 76 and may communicate with outlet port 77 through passage 81 in body 75. A valve member 82, provided with a hand grip 83 at one end, extends through cap 79 and into body 75. This valve member is provided with packing means at 84 to seal passage 81 and with packing 85 at its inner end to seal atmosphere port 78. Spring 86 surrounds valve member 82 in cap 79 and urges the valve member inwardly to a position closing passage 84 and opening port 78. When the parts are in the position shown in Fig. 4, atmospheric air acting through port 78 is in communication with line 33 of Fig. 1. When valve member 82 is pulled outwardly, packing 85 closes atmosphere port 78 and packing 84 moves out of passage 81 thereby opening passage 81 to connect outlet port 77 with the pressure inlet port 76 through recess 80.

One of the outlets of shut-off valve V leads from brake control shut off chamber 37b of the valve and connects, by means of line 37 to the coupling 38 for the trailer control line 39. This line leads to the control chamber of the trailer relay valve 41, it being understood that pressure is only supplied to the control line when the brakes are applied. The trailer relay valve normally receives air under pressure from a line 42 leading from emergency control shut off chamber 42b in the shut-off valve through coupling 43 and emergency line 44. The relay valve also receives air under pressure from line 46 leading from the trailer air reservoir. Thus, there are three inlets to the relay valve: the emergency line which is normally at full pressure, the control line which is at atmospheric pressure except when the brakes are applied, and the reservoir inlet line which is isolated until the brakes are applied. Relay valves having this mode of operation are well known in the brake art and the details thereof are not part of this invention.

Two outlet lines 48 lead from the trailer relay valve to the air chambers of trailer brake motors 49, which actuate the trailer brake linkage shown at 51. As is known in the art, a trailer relay valve (connected as shown) operates to set the brakes if the emergency line is opened for any reason because pressure in the emergency line connects the brake lines 48 with the trailer reservoir line 46. Thus, should pressure in the emergency line be lost the line 46 leading from the trailer reservoir is connected through the valve to the brake lines 48, thereby automatically applying the brakes. On the other hand, since the emergency line is normally at reservoir pressure, a slight leak in the line gives no signal and does not set either the tractor or the trailer brakes.

The structure of the shut-off valve V appears in Figs. 2 and 3. The valve body is made of several parts bolted together and comprises a central section 52, that is generally annular, and end sections 53 and 53a having chambers 42b and 37b, respectively, all sections being fastened together by means of through bolts 54 (seen in Fig. 2). Opposed diaphragms 56 are clamped between the central and end sections forming the control chamber 56a for the valve. Each end section has inlet port members 57 and 57a mounted by means of bolts 58 (Fig. 2). Each end section has a check valve seat 59 and a check valve 61 normally closed by a spring 62. Mounted in each end section is a plunger 63 having a port 64 that is closed when the plunger engages the associated check valve 61. Radial ports 66 in each of the plungers 63 establish communication between its port passage 64 and an associated passage 67 which communicates to the atmosphere through an exhaust check valve 67a. A piston seal 68 is provided to seal plunger 63 in its bore. End section 53 forms the emergency line section and is normally connected to the pressure source. It is provided with a second check valve 69 and seat 71 which serves as a safety valve in case a leak in the tractor line 31 arises which would otherwise bleed air pressure from the trailer reservoir. The fluid connections include: control port 33a connected to line 33 leading from the manual control valve; ports 31a and 29a connected respectively to the emergency and control lines; and, outlet ports 37a and 42a connected respectively to the trailer control and emergency lines.

The atmosphere bleed connections through the plunger bore 64, radial bores 66, and body port 67 is only needed in the emergency section 53 of the valve, its counterpart being provided solely to make the valve adaptable.

In normal operation the manual control valve is set to apply pressure to the control chamber of the shut-off valve V which, by means of the diaphragms and plungers opens both check valves and closes both air exhaust ports. Thus, there is a direct connection between the tractor and trailer emergency and control lines through the valve V. In the prior systems commonly employed, if the control line were improperly coupled, shut off, or fractured, the driver would be unable to apply the brakes on either the tractor or the trailer, and he would have received no warning of this dangerous situation. However, in accordance with this invention, if the driver steps on the tractor brake pedal and nothing happens, and so long as the trailer is running free indicating that the emergency line is connected, the driver knows there is a casualty in the control line and this is readily corrected by shifting the handle 36 of the manual control valve to vent the control chamber of the shut-off valve V. The check valves now spring to their closed positions isolating the control line systems for the tractor brakes which thereby permits the build up of pressure in the tractor reservoir to effect power application of the tractor brakes.

Also, the trailer brakes are automatically and instantly applied because with the control chamber 56a vented to atmosphere by way of line 33 and manually controlled valve C, the plunger 63 in section 53 is no longer held against the face of its associated check valve 61. Fluid pressure from emergency lines 42 and 44 therefore is vented directly to atmosphere by way of the passage 64 and radial ports 66 in valve 63, the exhaust passage 67 in the section 53 and the exhaust check valve 67a. The venting of pressure in lines 42 and 44 to atmosphere shifts the relay valve and thereby supplies fluid pressure from the tractor reservoir 47 through line 46 and lines 48 to the brake motors 49 to apply the trailer brakes.

Thus, the tractor and trailer are readily stopped for repair of the casualty to the control line system and what might be a dangerous or even fatal accident is avoided.

In case of damage of both the emergency and control lines, the operation is like that just described except that the trailer brakes are applied automatically and operation of the manual control valve merely restores control of the tractor brakes. In case the emergency line alone suffers the casualty, the trailer brakes are applied automatically. However, in conventional systems, the tractor brakes cannot be applied when the emergency line breaks because the tractor air reservoir pressure would bleed out through the fractured emergency line. In practicing this invention, this is prevented by moving the manual control valve to exhaust pressure in the shut-off valve control chamber which isolates the tractor emergency line 29 of the trailer by means of check valve 61 in section 53 and brake pressure can now build up in the tractor system. Thus, regardless of the nature of the casualty suffered to one or both lines extending between the trailer and the tractor, and regardless of whether or not the coupling elements are properly applied, and regardless of whether any shut-off valves may inadvertently have been left in the wrong position for operation, the driver will not lose control of the tractor brakes provided he operates the readily accessible manual control valve.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. A vehicle braking system comprising a fluid pressure reservoir, a tractor brake control valve, a relay emergency valve, a shut-off device having separate emergency and brake control shut-off chambers each provided with a check valve, valve-free emergency and brake control lines connecting said shut-off chambers with said relay valve, lines connecting said reservoir with said emergency shut-off chamber and with said tractor brake control valve, a line connecting said tractor brake control valve with said brake control shut-off chamber, and means for simultaneously opening the check valves of said chambers, said means including a control chamber in said shut-off device, a line connecting said fluid pressure reservoir with said control chamber and including a manually operated valve to control flow of fluid under pressure from said reservoir into said control chamber and piston means in said shut-off chambers and actuated by pressure of fluid from said reservoir when said control valve is opened to open the check valves in said shut-off chambers when fluid under pressure is admitted into said control chamber, said piston means including stems having passages therethrough which are closed when the piston means engage said check valves and are open at all other times.

2. A vehicle braking system comprising a fluid pressure reservoir, a tractor brake control valve, a relay emergency valve, a shut-off device having separate emergency and brake control shut-off chambers each provided with a check valve and partly defined by a partition oppositely disposed to said check valve, valve-free emergency and brake control lines connecting said shut-off chambers with said relay valve, lines connecting said reservoir with said emergency control shut-off chamber and with said tractor brake control valve, a line connecting said tractor brake control valve with said brake control shut-off chamber, and means for simultaneously controlling the check valves of said shut-off chambers, said means including a control chamber in said shut-off device partly defined by flexible walls, a line connecting said fluid pressure reservoir with said control chamber and including a manually operated valve to control flow of fluid under pressure from said reservoir into said control chamber and separate pistons extending through said partitions with fluid-tight sealing engagement therewith, said pistons being engageable with and movable by said flexible walls to engage and open said check valves when fluid under pressure is admitted into said control chamber by said manual control valve, said pistons having passages therethrough which are closed by engagement of the pistons with the check valves and which are open and serve to vent the shut-off chambers when the fluid pressure in the control chamber is reduced sufficiently for the pistons to move out of engagement with said check valves.

3. A shut-off valve for a vehicle braking system comprising a body having separate fluid chambers therein connectible in control and emergency lines, respectively, and partly defined by partitions and partly by oppositely disposed flexible walls between said partitions, check valves for closing each of said chambers and means for simultaneously opening said check valves, said means including a control chamber between and partly defined by said flexible walls, and pistons slidable in said partitions and having heads engaging with said flexible walls and stems extending from said heads into said chambers to engage and open said check valves, and a valve controlled line opening into said control chamber for admitting fluid under pressure into said chamber to press said flexible walls against the piston heads and to move the stems in said partitions.

4. A shut-off valve for a vehicle braking system comprising a body having fluid chambers therein partly defined by partitions and connectible in control and emergency lines, respectively, check valves for closing each of said chambers and means for simultaneously opening said check valves, said means including a control chamber disposed between said fluid chambers and having opposed flexible walls, and pistons slidable in said partitions and having heads engaging with said flexible walls and cylindrical stems extending in opposite directions therefrom, and a valve controlled line opening into said control chamber for admitting fluid under pressure thereinto to press said flexible walls against said head and to move said stems to engage and open said check valves, and sealing means around said stems and slidably engageable with said partitions for sealing against escape of fluid from said fluid chambers between the stem and valve body.

5. A shut-off valve for a vehicle braking system comprising a body having fluid chambers therein partly defined by partitions and connectible to control and emergency lines, respectively, check valves biased to a closed position to isolate the control and emergency lines from their respective chambers, and means for simultaneously opening said check valves, said means including a control chamber disposed between said fluid chambers and having opposed flexible walls, and pistons slidable in said partitions and having heads engaging with said flexible walls and stems extending in opposite directions therefrom to engage and open said check valves when fluid under pressure is admitted into said control chamber, said pistons having connected axial and radial openings therethrough on opposite sides of said partitions to vent the fluid chambers to the atmosphere only when the check valves are in closed position.

6. A shut-off valve for a vehicle braking system comprising a body having fluid chambers therein partly defined by partitions and connectible to control and emergency lines, respectively, check valves biased to a closed position to isolate the control and emergency lines from their respective chambers, and means for simultaneously opening said check valves, said means including a control chamber disposed between said fluid chambers and having opposed flexible walls, and pistons slidable in said partitions and having disk-shaped heads engaging with said flexible walls and cylindrical stems extending in opposite directions therefrom to engage and open said check valves when fluid under pressure is admitted into said control chamber, said stems having axial openings extending inwardly from their free ends and closed while the stems engage the check valves and radial openings near said heads on the other sides of said partitions and extending from the axial openings to the outer surfaces of said stems and connecting the fluid chambers to the atmosphere only when the check valves are in closed position, and sealing means around said stems and slidably engageable with the partitions for sealing against escape of fluid from said fluid chambers between the stem and valve body.

References Cited in the file of this patent

UNITED STATES PATENTS

| 2,084,707 | Robinson | June 22, 1937 |
| 2,451,139 | Williams et al. | Oct. 12, 1948 |
| 2,490,420 | Davis | Dec. 6, 1949 |
| 2,570,874 | Shumaker | Oct. 9, 1951 |
| 2,571,885 | Ingers | Oct. 16, 1951 |
| 2,602,467 | Griswold | July 8, 1952 |
| 2,645,239 | Horn et al. | July 14, 1953 |